United States Patent
Chittor et al.

Patent Number: 6,145,062
Date of Patent: Nov. 7, 2000

[54] SELECTIVE CONFLICT WRITE FLUSH

[75] Inventors: Suresh Chittor; Suneeta Sah; Prantik Kumar Nag; Joseph Ku, all of Portland, Oreg.

[73] Assignee: Intel Corporation, Santa Clara, Calif.

[21] Appl. No.: 09/013,775

[22] Filed: Jan. 26, 1998

[51] Int. Cl.[7] ................................................ G06F 12/00
[52] U.S. Cl. ...................... 711/154; 711/154; 711/158; 711/135; 710/52
[58] Field of Search ................................ 710/52, 53, 54, 710/55, 56, 57; 711/135, 141, 143, 156, 168, 158, 154

[56] References Cited

U.S. PATENT DOCUMENTS

| | | | |
|---|---|---|---|
| 5,125,083 | 6/1992 | Fite et al. ............................ | 395/375 |
| 5,432,918 | 7/1995 | Stamm ................................. | 395/425 |
| 5,666,494 | 9/1997 | Mote, Jr. ............................. | 711/167 |
| 5,903,776 | 5/1999 | Larson ................................ | 395/874 |

*Primary Examiner*—John W. Cabeca
*Assistant Examiner*—Pierre Vital
*Attorney, Agent, or Firm*—Kenyon & Kenyon

[57] ABSTRACT

A method and apparatus of selectively flushing a conflicted write transaction from a memory controller. According to the method, a new transaction is received that identifies a memory address to which the transaction is directed. It is determined whether an address of the new transaction matches an address of any previously queued transaction. When a match occurs, the one previously queued transaction that matches the new transaction is flushed from queue.

13 Claims, 3 Drawing Sheets

SELECTIVE CONFLICT WRITE FLUSH

BACKGROUND OF THE INVENTION

The present invention relates to a system of flushing conflicted write transactions from a memory controller.

Modern computer systems are multi-agent systems. A typical application is shown in FIG. 1. An "agent" may be a processor, a memory controller or an input/output device. Some agents, such as processors, manipulate data while others, such as memory controllers, may merely store and retrieve data. However, the agents must coordinate with each other to maintain data coherency. Thus, the agents 10–50 communicate with each other over a common bus 60 using a predetermined signaling protocol.

A memory controller system 50 is a common type of agent. The memory controller system is a common agent that controls reading and writing of data to and from a memory. Thus, when an agent (such as agent 10) requires data held in memory, it begins a bus transaction to request the data. All other agents observe the transaction and determine whether they possess the requested data. If the memory controller system 50 possesses the data, it provides the requested data on the bus 60. The first agent 10 then retrieves the requested data from the bus 60 and uses it as necessary.

The memory controller system 50 also writes data to memory. When an agent issues a bus transaction to write data to memory, the memory controller system retrieves data from the external bus.

The memory controller system generally includes a memory controller 51, a data controller 52 and the memory 53 itself. The memory controller 51 processes administrative information related to a bus transaction. For example, transactions include request identifiers that indicate the type of request being made (for example, read or write). They also include address information identifying a memory address where the transaction is directed. This administrative information is processed by the memory controller 51.

For write transactions, data to be written to memory is stored temporarily in a data controller 52, an intermediate buffer memory. Data is transferred from the data controller to memory sometime after the conclusion of the bus transaction. It is common for memory controller systems to process administrative information and data in separate paths, such as in the memory controller 51 and the data controller 52.

As is known, memories are traditionally slow devices in a computer system. Transactions may be posted on the bus faster than a memory controller may serve them. Accordingly, it is known for memory controllers to prioritize processing of requests to improve transaction throughput. Read around write ("RAW") techniques are one such priority scheme.

RAW techniques recognize that read requests have a higher priority than write requests. When another agent issues a read request, the agent typically requires the requested data to perform some operation. The agent must wait for the data to complete the operation. Any increase in the latency of the read request, the time that it takes a transaction to be completed, may impair the agent's processing performance. Write transactions, however, often are not critical. When an agent issues a write transaction, the data typically has no implication on any agent's performance. Accordingly, write transactions need not be implemented with the same priority that read transactions are implemented.

Memory controllers may include a write queue that stores write transactions to implement RAW. The write queue may be a first in, first out ("FIFO") queue. The write transactions are stored temporarily in anticipation of idle time in which the stored transactions may be performed. Read requests issued on the bus are not queued; they are processed immediately upon receipt. Thus, although a write transaction may precede a read request when observed on the bus, the memory controller may complete the read request before it completes the write request. In this case, the memory controller performs the read request around the write request.

Memory controllers monitor the bus to recognize "implicit write backs." Implicit write backs occur when a first agent 10 issues a read request directed to a particular address and a second agent 20 possesses a modified copy of data from that address. The second agent 20 may have read it from memory 52 at some point earlier and performed an operation that modified the data. There is no requirement in many multi-agent systems that an agent 20 that modifies data must also write the modified data back to memory; it may store the data in an internal cache. Typically, when a second agent 20 possesses a modified copy of data requested by a first agent 10, the second agent 20 rather than the memory controller 50 will transfer data to the first. As part of the bus protocol, the agents must engage in a cache coherency signaling protocol to identify where the most current copy of requested data is located. In the Pentium Pro® processor, "snoop signaling" is exchanged to perform this cache coherency function.

To transfer data in the implicit write back case, the second agent 20 places the modified data on the bus. The first agent 10 reads the data from the bus and processes the data. The memory controller 50 also reads the data from the bus and causes it to be written to memory. Thus, although the data is provided to the memory controller 50 during a read request, it causes data to be written to memory. It is an "implicit write back." Implicit write back and traditional writes are both treated identically within the memory controller. Both may be considered low priority transactions for RAW processing.

RAW techniques raise an additional processing issue. Occasionally, an agent issues a read request for data at an address then a write transaction to that address is pending in the write queue. The pending write transaction is considered a "conflicted write transaction." Before the read request may be completed, the conflicted write must be performed.

In the known memory controllers, the conflicted write is flushed from the write queue along with every pending write transaction stored in queue ahead of the conflicted write transaction. Thus, the memory controller identifies the queue position of the conflicted write. Then, all write transactions from the head of the write queue to and including the conflicted write are output from the queue and performed. If the conflicted write is tenth in position in the queue, for example, then ten write transactions are performed sequentially. The read request is stalled until the conflicted write transaction is performed.

The known technique of flushing conflicted write transactions imposes unnecessary latency to a read request. If $T_{wflush}$ is the average time required to flush a single transaction from the write queue and k is the queue position of the conflict write transaction, the read request will be stalled according to:

$$\text{read-stall latency} = k * T_{wflush}.$$

These techniques impose unnecessary latency to the stalled read request because a plurality of transactions often are flushed even when it is necessary that only one transaction be flushed.

Thus, there is a need in the art for a technique of flushing conflicted write transactions that minimizes read latency. There is a need in the art for such a transaction that flushes only a conflicted write transaction from a write queue.

SUMMARY OF THE INVENTION

In accordance with an embodiment of the present invention, in order to selectively flush a conflicted write transaction from a memory controller, when a new transaction is received that identifies a memory address to which the transaction is directed, it is determined whether an address of the new transaction matches an address of any previously queued transaction. When a match occurs, the one previously queued transaction that matches the new transaction is flushed from queue.

DETAILED DESCRIPTION

The disadvantages of the prior art are alleviated to a great extent by a memory controller that provides for selective flushing of conflicted write transactions. When the memory controller receives a new request that conflicts with a pending write transaction, the one write transaction is flushed from the memory controller. However, no other pending write transactions are flushed.

Figure 1:
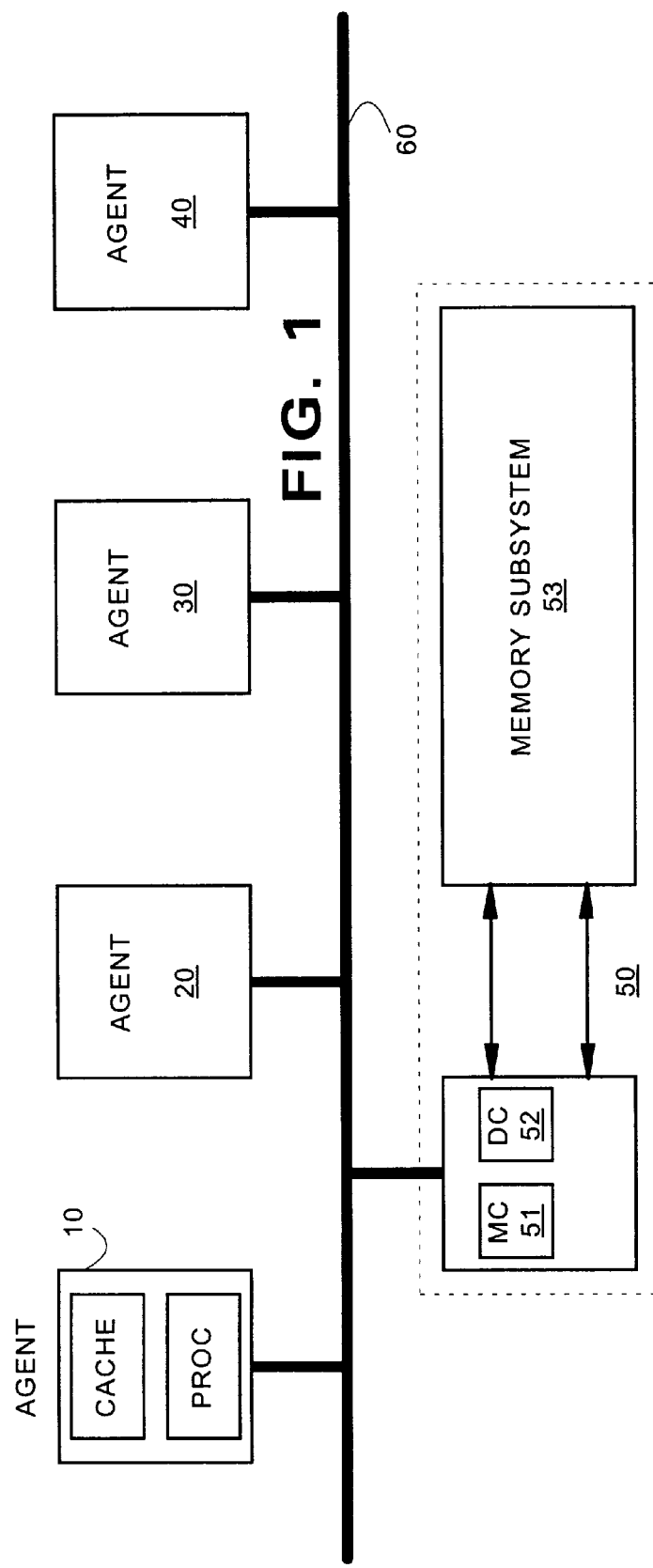
FIG. 1 illustrates a block diagram of a typical multi-agent computer system.
Figure 2:
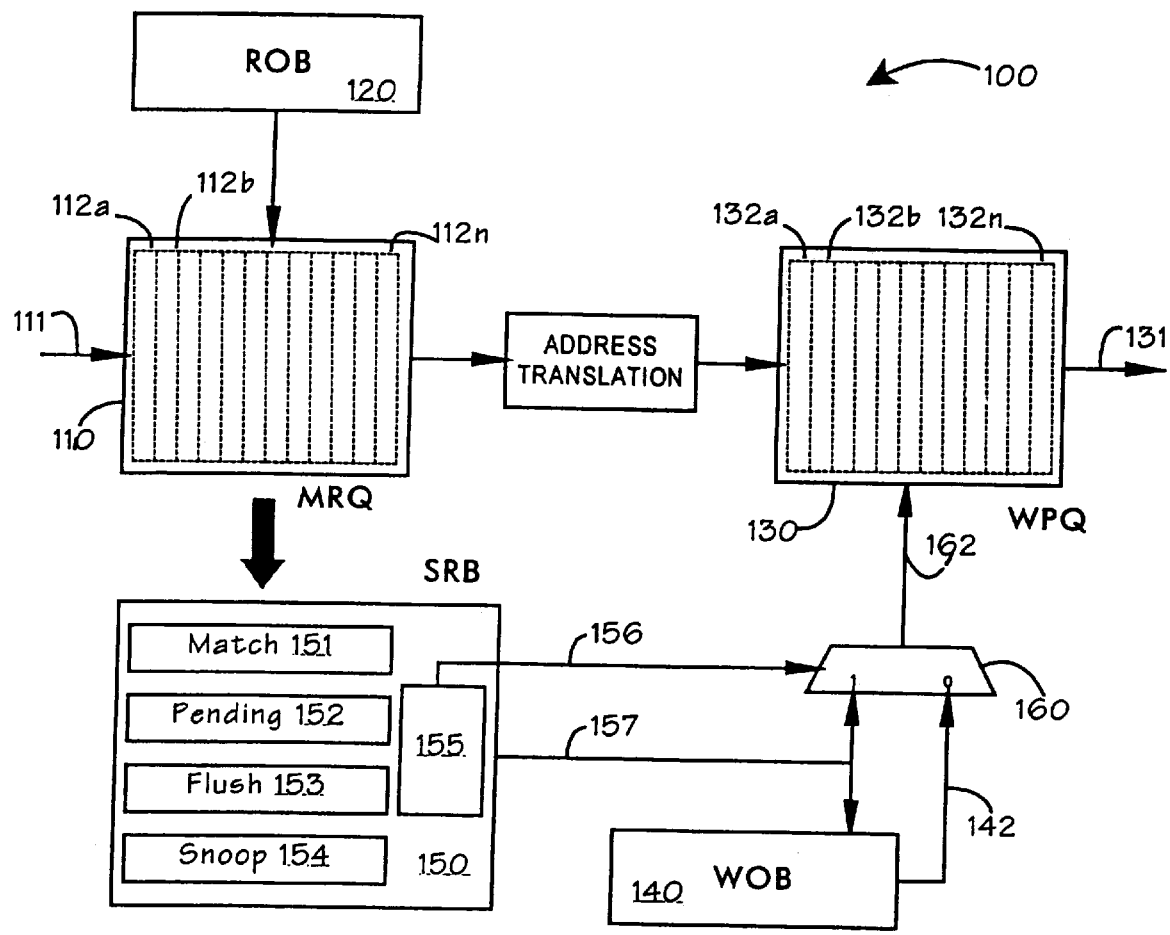
FIG. 2 illustrates a block diagram of a memory controller constructed in accordance with a first embodiment of the present invention.

FIG. 2 is a block diagram of memory controller 100 constructed in accordance with an embodiment of the present invention. It may substitute for memory controller 51 of FIG. 1. As is conventional to many memory controllers, the memory controller 100 receives transaction data from a bus cluster in the memory controller system 50. It also interfaces with a data controller, such as 52 in FIG. 1, to cause queued data to be written to memory subsystem 53. For simplicity, the bus cluster and data controller are not shown in FIG. 2.

The memory controller 100 may include a Memory Request Queue 110 ("MRQ"), a Read Order Buffer 120 ("ROB"), a Write Post Queue 130 ("WPQ"), a Write Order Buffer 140 ("WOB"), a Status Register Block 150 ("SRB") and a selection switch 160. Administrative data of transactions are received from the bus cluster over line 111 and stored in the MRQ 110. When write transactions are performed, transaction data is output from the memory controller 100 via line 131.

The MRQ 110 is a random access queue that possesses content addressable logic. It is populated by a number of queue entries 112a–n. The MRQ 110 stores administrative data of a transaction such as the request type and address information noted above. For each request, the MRQ 110 also identifies a location in the data controller 52 where associated data is buffered.

The ROB 120 is a FIFO queue that stores pointers to entries in the MRQ 110. When a read transaction is received by the memory controller 100, the transaction is stored in an entry in the MRQ 110, such as entry 112b. A pointer to entry 112b is stored in the ROB 120. In the normal case, because RAW techniques assign a high priority to read transactions in memory controllers, the number of queued read requests are quite small.

The WPQ 130 is a second random access queue having the same number of entries 132a–n as the MRQ 110. Write transactions that are queued in the MRQ 110 are subject to address translation and stored in a corresponding entry in the WPQ 130. Thus, if a transaction were stored in location 112b in the MRQ 110, it will be stored in location 132b in the WPQ 130. The translated addresses identify the actual location of the address within the memory circuits and include, for example, identifiers of card numbers, bank numbers and row numbers where the address is found. Address translation is well known. The WPQ 130 reads transaction data out of a queue entry and posts it on line 131 in response to a readout pointer input to it over line 162.

The WOB 140 is a FIFO queue that contains pointers to entries in the MRQ 110 and the WPQ 130. The WOB 140 determines the order in which write transactions are to be processed in the normal case. When a write transaction is received by the memory controller 100, the transaction is stored in an entry in the MRQ 110, such as entry 112c. The transaction is subject to address translation and stored in the corresponding entry 132c in the WPQ 130. A pointer to the entries 112c/132c is stored in the WOB 140. When idle time permits write transactions to be implemented by the memory controller 100, a pointer is read out of the WOB 140 to the WPQ 130 via lines 142 and 162.

The SRB 150 contains a number of registers representative of the status of transactions being performed by the memory controller 100. They include a match register 151, a pending register 152, a flush register 153, a snoop register 154 and a decoder 155.

The match register 151 includes a bit position associated with each entry 112a–n in the MRQ 110. When a new transaction is received to the memory controller 110, the content addressable memory logic compares the address of the new transaction with the addresses of stored transactions. If the new address matches an address of a transaction stored in the MRQ 110, a flag is set in the corresponding bit position of the match register 151. For example, a match may be indicated by a logical 1, with ø's elsewhere.

In an alternative, the comparison of newly received and stored addresses need not compare every bit position of the respective addresses. A portion of each address may be used for comparison. Partial address comparisons are done slightly faster than a full address comparison which may be viewed as preferable even though some false flushes would occur. The false flushes do not cause significant overall performance degradation.

The pending register 152 includes a bit position associated with each entry 112a–n in the MRQ 110. The pending register 152 identifies which write transactions stored in the MRQ 110 have yet to be completed. When transaction data is stored in the MRQ 110, a flag is set in the corresponding bit position in the pending register 152 if the request type indicates that the transaction is a write transaction. Pending write transactions may be indicated by a logical 1, with ø's elsewhere. Flags in the pending register 152 are cleared when the associated transaction advances out of queue.

The pending register 152 accommodates implicit write back transactions, those that are posted as a read transaction but cause data to be written to memory. When a new request is stored in the MRQ 110, the corresponding entry in the pending register 152 is enabled simulating a write transaction. The entry may be modified by the cache coherency signaling. If the cache coherency signaling indicates that an implicit write back will not occur, the entry in the pending register is disabled. It remains enabled if the implicit write back will occur.

The flush register 153 also includes a bit position associated with each entry 112*a*–*n* in the MRQ 110. Entries in the flush register 153 identify whether a conflicted write transaction is present in the MRQ 110. When logical 1's identify matches and pending write transactions, flush register entries may obtained by an AND-ing of the corresponding entries of the match register 151 and the pending register 152. In this case, a 1 in any bit position of the flush register indicates a conflicted write transaction as the corresponding MRQ entry 112.

Thus, the status of the flush register 153 determines whether a conflicted write transaction is present.

The snoop register 154 marks the status of transactions stored in the MRQ 110. For each MRQ entry, the snoop register 154 stores two types of information. First, the register 154 identifies whether the associated transaction has reached the snoop phase. Second, the snoop register 154 stores the cache coherency.

The contents of the flush register 153 and the snoop register are input to a decoder 155. The decoder indicates a conflict on control line 156 when cache coherency results have been returned and a conflicted write or implicit write back exists. On line 157 it outputs a conflicted write pointer identifying the MRQ entry 112 where the conflicted transaction is stored.

The control line 156 from the SRB 150 is input to the selection switch 160. The output 162 from the selection switch 160 determines which write transaction will be performed next by the WPQ 130. The selection switch selects one of two possible inputs. When the control line is not asserted, the selection switch allows the pointers output from the WOB 140 over line 142 to be input to the WPQ 130 as described above. When the control line is asserted, the conflicted write pointer from line 157 is input to the WPQ 130 over line 162. In response, the WPQ 130 reads out the conflicted write transaction from the queue and outputs it on line 132.

The conflicted write pointer on line 157 is input to the WOB 140 as well. Before a conflict arose, a pointer to the write transaction was stored in the WOB 140 for in-order processing. Because the conflict causes the transaction to be processed out of order, the pointer must be removed from the WOB 140. Content addressable logic in the WOB 140 identifies the pointer's position. The WOB 140 shifts all queued transactions behind the pointer ahead to remove the pointer from WOB 140.

The system of FIG. 2 permits a selected conflicted write transaction to be flushed from a write queue without requiring additional write transactions to be flushed with it. This reduces latency of read requests because less processing is required before the read request is performed. The selected conflict write flushing of the present invention contributes to improved system performance. The present invention is configured to ensure that at most one write transaction is stored in the MRQ that is directed to a particular memory address. This also minimizes the latency of the stalled read transaction when a conflicted write appears because at most one write transaction will be flushed from queue.

Figure 3:
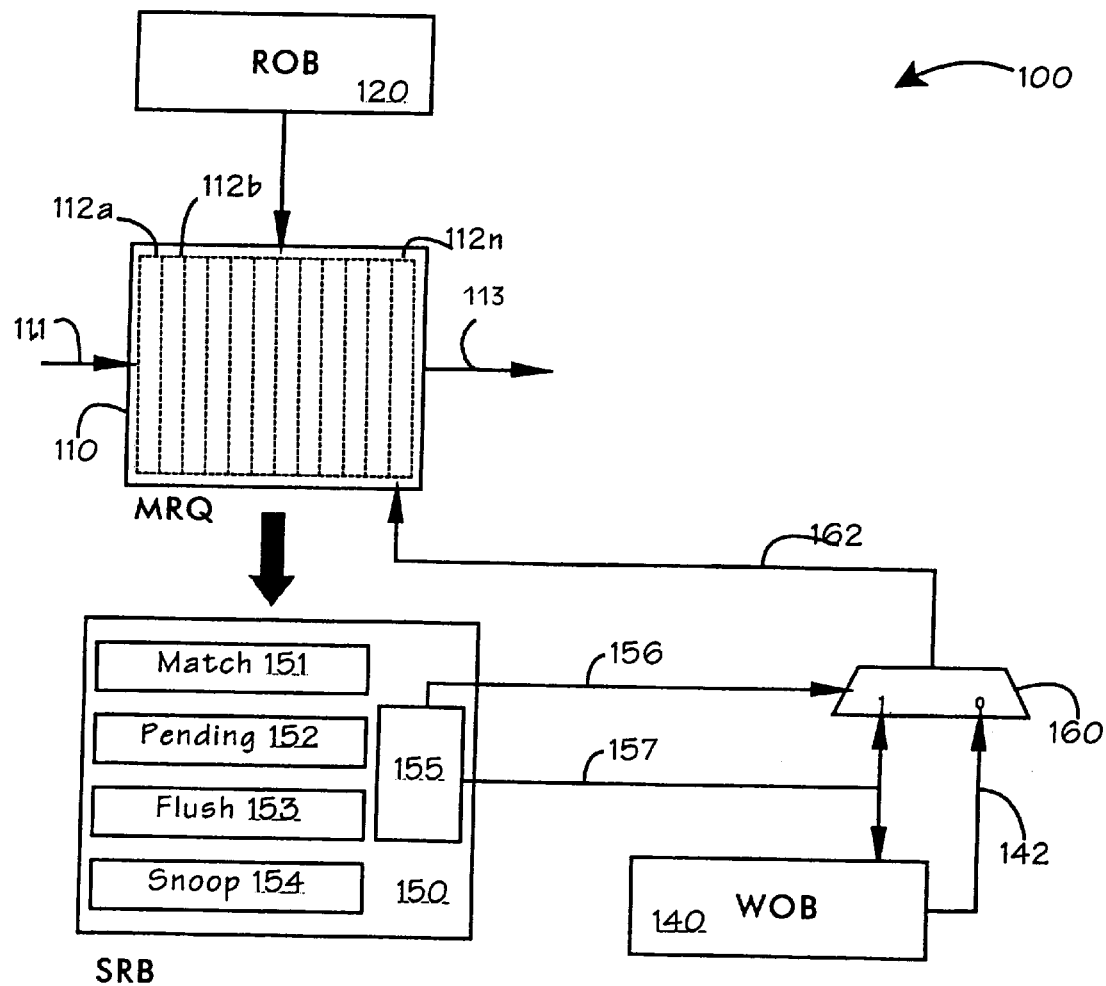
FIG. 3 illustrates a block diagram of a memory controller constructed in accordance with a second embodiment of the present invention.

A second embodiment of the present invention is shown in FIG. 3. As shown, the memory controller 100 omits the WPQ 130 of FIG. 2. In this second embodiment, the output 162 of selection switch 160 is input to MRQ 110. The MRQ 110, in response to the read out pointer 162, reads a transaction out of an identified queue position 112 and outputs it on line 113. After having been read out of the MRQ 110, the address of the queued transaction is subject to address translation as described above.

This second embodiment benefits from a reduction in the number of components used in the memory controller 100. The WPQ 130 is omitted in this second embodiment. However, address translation is a process that requires time to perform. Where the second embodiment benefits from an advantage in that it employs a less complicated design, when conflicted write transactions are observed, it may impose increased latency upon a stalled read transaction because the address translation function will be performed only after the conflicted write appears.

Thus, the present invention permits a conflicted write transaction to be flushed from a write queue without requiring other, non-conflicting write transactions to be flushed with it. When the conflicted write transaction is finished from the write queue, it may be performed in memory. The present invention reduces latency of read requests because the duration of write flushing is maintained at a minimum. Accordingly, the selected conflict write flushing of the present invention contributes to improved system performance.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A memory controller, comprising:

a memory request queue having a plurality of queue entries that store pending write transactions, having content addressable logic that generates a comparison signal representative of a match between an address of a newly received transaction and addresses of the pending write transactions, a write post queue, having a plurality of queue entries each corresponding to a queue entry in the memory request queue and storing pending write transactions having been subject to address translation, the write post queue reading a pending write transaction from a queue entry to an output in response to a readout pointer received at a posting input, a status request buffer that stores the comparison signal and, when the comparison signal indicates that a match occurred, enables a control signal and generates a conflict pointer identifying the position of the matching pending transaction in the memory request queue, and a selection switch having an output that is input to the write post queue at the posting input, the selection switch receiving the conflict pointer as an input.

2. A method of selectively flushing conflicted write transactions from a memory controller, comprising:

storing data of a plurality of previously posted transactions in a first queue, for the write transactions in the first queue, storing address translated data of the write transactions in a second queue, receiving a new transaction identifying a memory address of data to which the transaction is directed, comparing the address of the new transaction to addresses of transactions previously stored in the first queue, when an address match occurs, identifying a queue position of the one previously stored transaction that causes the match, and reading the one previously stored transaction from the queue position in the second queue.

3. The method of claim 2, wherein the memory controller includes a write order buffer that identifies an order of processing of the previously stored write transactions, the method further comprising:

identifying a position of the one previously stored transaction in the write order buffer, deleting the one previously stored transaction from the write order buffer, shifting other transactions behind the position of the one previously stored transactions ahead one position in the write order buffer.

4. A memory controller, comprising:

a first queue having a plurality of queue entries that store pending write transactions, queue entries having an address field, a portion of each address field including content addressable logic that generates a comparison signal representative of a match between a portion of an address of a newly received transaction and contents of the address field portion of the queue entries, the queue reading a stored transaction from a queue entry to an output in response to a readout pointer received at a posting input, a second queue having queue entries corresponding to the queue entries of the first queue, the second queue storing the pending write transactions having been subject to address translation, a status request buffer that stores the comparison signal and, when the comparison signal indicates that a match occurred, enables a control signal and generates a conflict pointer representing a queue position of the matching pending transaction, and a selection switch having an output that is input to the posting input, the selection switch receiving the conflict pointer as an input.

5. The memory controller of claim 4, further comprising a write order buffer that stores pointers of queue entries, the pointers organized in a FIFO order of the pending transactions, an output of the write order buffer input to the selection switch, wherein the selection switch selects the output of the write order buffer when the control signal is disabled.

6. The memory controller of claim 4, wherein the status request buffer comprises:

a match register that stores the comparison signal, a pending register that identifies which queue entries contain pending transactions, and a flush register that compares the contents of the match register and the pending register, wherein the contents of the flush register determine the status of the control signal.

7. The memory controller of claim 4, wherein the new transaction is a write transaction.

8. The memory controller of claim 4, wherein the new transaction is a read transaction.

9. A memory controller, comprising:

a first queue to store data of a plurality of previously posted transactions from an external bus, a second queue to store write transactions from the first queue, addresses of the write transactions having been subject to address translation, comparison logic that compares an address of a new transaction with addresses of pending write transactions in the first queue, prioritizing logic, responsive to a match between the addresses, that causes only the matching write transaction to be flushed from the second queue.

10. The memory controller of claim 9, wherein:

the first queue stores pending write transactions in a plurality of queue entries, and the comparison logic includes a register having a bit position associated with each of the queue entries, wherein a bit position is enabled when an address match occurs between the address of the new transaction and the address of the pending transaction stored in the corresponding queue entry.

11. The memory controller of claim 9, further including a write order buffer that causes write transactions to be flushed from the second queue in a predetermined order in the absence of a match.

12. The memory controller of claim 9, wherein the new transaction is a write transaction.

13. The memory controller of claim 9, wherein the new transaction is a read transaction.

* * * * *